(12) United States Patent
Baele et al.

(10) Patent No.: US 8,891,825 B2
(45) Date of Patent: Nov. 18, 2014

(54) TRACKING METHOD (75) Inventors: Xavier Baele, Brussels (BE); Laurent Guigues, Brussels (BE); Javier Martinez Gonzalez, Brussels (BE)

(73) Assignee: Softkinetic Software, Brussels (BE)

( * ) Notice: Subject to any disclaimer, the term of this patent is extended or adjusted under 35 U.S.C. 154(b) by 317 days.

(21) Appl. No.: 13/518,989

(22) PCT Filed: Dec. 28, 2010

(86) PCT No.: PCT/EP2010/070821
§ 371 (c)(1),
(2), (4) Date: Sep. 26, 2012

(87) PCT Pub. No.: WO2011/080282
PCT Pub. Date: Jul. 7, 2011

(65) Prior Publication Data
US 2013/0016879 A1    Jan. 17, 2013

(30) Foreign Application Priority Data
Dec. 28, 2009   (EP) ..................................... 09180785

(51) Int. Cl.
*G06K 9/00* (2006.01)
*G06K 9/62* (2006.01)
*G06T 7/00* (2006.01)
*H04N 5/225* (2006.01)

(52) U.S. Cl.
CPC .......... *G06T 7/0079* (2013.01); *G06K 9/00201* (2013.01); *G06K 9/6223* (2013.01)
USPC .......................................... 382/103; 348/169

(58) Field of Classification Search
USPC .......... 382/103, 154, 209, 225, 236; 348/154, 348/155, 169, 170, 171, 172, 208.1, 208.14, 348/352
See application file for complete search history.

(56) References Cited

U.S. PATENT DOCUMENTS 6,771,818 B1 *  8/2004  Krumm et al. ................ 382/225
2006/0239558 A1  10/2006  Rafii et al.

FOREIGN PATENT DOCUMENTS

| JP | 2000357233 A | 12/2000 |
| JP | 2008165595 A | 7/2008 |
| WO | 2008/128568 A1 | 10/2008 |

OTHER PUBLICATIONS

International Search Report for PCT/EP2010/070821 dated Apr. 5, 2011.
Japanese Office Action dated Aug. 16, 2013, issued in Japanese Patent Application No. 2012546440.

* cited by examiner

*Primary Examiner* — Abolfazl Tabatabai
(74) *Attorney, Agent, or Firm* — Sughrue Mion, PLLC (57) ABSTRACT

The present invention relates to a method for tracking at least one object in a sequence of frames, each frame comprising a pixel array, wherein a depth value is associated to each pixel. The method comprises grouping at least some of said pixels of each frame into several regions, grouping said regions into clusters ($B_1, \ldots, B_5$) of interconnected regions; and determining that a cluster ($B_2, \ldots, B_5$) which is adjacent to another cluster ($B_1$) in a two-dimensional projection belongs to an object partially occluded by said other cluster ($B_1$) if it has a different depth value than said other cluster ($B_1$).

18 Claims, 9 Drawing Sheets

TRACKING METHOD

CROSS REFERENCE TO RELATED APPLICATIONS

This application is a National Stage of International Application No. PCT/EP2010/070821 filed Dec. 28, 2010, claiming priority based on European Patent Application No. 09180785.9 filed Dec. 28, 2009, the contents of all of which are incorporated herein by reference in their entirety.

TECHNICAL FIELD

The present invention relates to a method for tracking at least one object in a frame sequence, each frame comprising a pixel array, wherein a depth value is associated to each pixel.

BACKGROUND OF THE INVENTION

In order to track a real-world object, it has long been proposed to use data processing devices connected to imaging devices and programmed so as to track the object in a video sequence produced by the imaging device and comprising a sequence of successive frames, each frame comprising a pixel array.

For instance, the article "Tracking by Cluster Analysis of Feature Points using a Mixture Particle Filter", by Wei Du and Justus Piater, disclosed a method for tracking an object in a video sequence, using the Harris corner detector and the Lucas-Kanade tracker. However, since this method is applied on a bidimensional video sequence without pixel depth information, its performance is limited despite considerable data processing requirements.

Some other relevant papers disclosing methods for tracking one or several objects in video sequences with bidimensional pixel arrays are:

S. McKenna, S. Jabri, Z. Duric and H. Wechsler, "Tracking Groups of People", Computer Vision and Image Understanding, 2000.

F. Brémond and M. Thonnat, "Tracking multiple nonrigid objects in video sequences", IEEE Trans. On Circuits and Systems for Video Techniques, 1998.

I Haritaoglu, "A Real Time System for Detection and Tracking of People and Recognizing Their Activities", University of Maryland, 1998.

G. Pingali, Y. Jean and A. Opalach, "Ball Tracking and Virtual Replays for Innovative Tennis Broadcasts", 15th Int. Conference on Pattern Recognition.

However, since these tracking methods are carried out on 2D video sequences without any direct pixel depth information, their performance is necessarily limited, since image segmentation can only be based on other object attributes such as colour, shape or texture.

It has already been proposed, for instance in International Patent Application WO2008/128568, to use 3D imaging systems providing video sequences wherein a depth value is associated to each pixel of each frame. Such a tracking method generates more and more useful positional information about a tracked object than one based on purely two-dimensional images. In particular, the use of 3D imaging systems facilitates the discrimination between foreground and background. However, the disclosed method does not address the problem of tracking more than one object, and in particular that of tracking an object at least partially occluded by another object in the field of view of the 3D imaging system. In WO 2008/128568, a method for recognising a volume within three-dimensional space is disclosed in which three-dimensional image data comprises a plurality of points within the three-dimensional space. These points are clustered and a cluster is selected as a point of interest. The points within the selected cluster are re-grouped into sub-clusters, each of which having a centroid and a volume associated with the centroid. Centroids can be connected to form a network indicative of an object and the extremities are identified as being a centroid that is connected to only one other centroid.

Other tracking methods using 3D video sequences, but which fail to address the occlusion problem have been disclosed by A. Azerbayerjani and C. Wren in "Real-Time 3D Tracking of the Human Body", Proc. of Image'com, 1996; and by T. Olson and F. Brill in "Moving Object Detection and Event Recognition Algorithms For Smart Cameras", Proc. Image Understanding Workshop, 1997.

A number of other disclosures have addressed this occlusion problem. A number of various methods has been presented by Pierre F. Gabriel, Jacques G. Verly, Justus H. Piater, and André Genon of the Department of Electrical Engineering and Computer Science of the University of Liège in their review "The State of the Art in Multiple Object Tracking Under Occlusion in Video Sequences".

A. Elgammal and L. S. Davis in "Probabilistic framework for segmenting people under occlusion", Proc. of IEEE 8th International Conference on Computer Vision, 2001; I. Haritaoglu, D. Harwood and L. Davis in "Hydra: Multiple People Detection and Tracking", Workshop of Video Surveillance, 1999; S. Khan and M. Shah in "Tracking People in Presence of Occlusion", Asian Conference on Computer Vision", 2000; H. K. Roh and S. W. Lee in "Multiple People Tracking Using an Appearance Model Based on Temporal Color", International Conference on Pattern Recognition, 2000; and A. W. Senior, A. Hampapur, L. M. Brown, Y. Tian, S. Pankanti and R. M. Bolle in "Appearance Models for Occlusion Handling", 2nd International Workshop on Performance Evaluation of Tracking and Surveillance Systems", 2001 have disclosed tracking methods addressing this occlusion problem. However, as all these methods are based on 2D or stereo video sequences comprising only bidimensional pixel arrays without any depth data, their performance is limited.

A. F. Bobick et al in "The KidsRoom: A perceptually based interactive and immersive story environment", Teleoperators and Virtual Environment, 1999; R. T. Collins, A. J. Lipton, and T. Kanade in "A System for Video Surveillance and Monitoring", Proc. 8th International Topical Meeting on Robotics and Remote Systems, 1999; W. E. L. Grimson, C. Stauffer, R. Romano, and L. Lee in "Using adaptive tracking to classify and monitor activities in a site", Computer Society Conference on Computer Vision and Pattern Recognition; as well as A. Bevilacqua, L. Di Stefano and P. Tazzari in <<People tracking using a time-of-flight depth sensor>>, IEEE International Conference on Video and Signal Based Surveillance, 2006, disclosed object tracking methods based on a top-down scene view. However, as a result, the information available over the tracked object, in particular when it is a human user, is limited.

Dan Witzner Hansen, Mads Syska Hansen, Martin Kirschmeyer, Rasmus Larsen, and Davide Silvestre, in "Cluster tracking with time-of-flight cameras", 2008 IEEE Computer Society Conference on Computer Vision and Pattern Recognition Workshops, disclosed an object tracking method in which the objects are also tracked in a homographic plane, i.e. in a "top-down" view. This method uses an Expectation Maximisation algorithm. However, it is also insufficiently adapted for gesture recognition if the tracked objects are human users.

Leila Sabeti, Ehsan Parvizi and Q. M. Jonathan Wu also presented an object tracking method using a 3D video sequence with pixel depth data in "Visual Tracking Using Colour Cameras and Time-of-Flight Range Imaging Sensors", Journal of Multimedia, Vol. 3, No. 2, June 2008. However, this method, which uses a Monte-Carlo-based "particle filter" tracking method, also requires considerable data processing resources.

US 2006/239558 discloses a three-dimensional imaging system that produces an image of a scene. Pixels within the image of the scene are labelled according to which object in the scene they are related to, and are assigned with a value. Groups of pixels having the same label are grouped to form "blobs", each blob corresponding to a different object. Once the blobs are defined, they are modelled or quantised into variously shaped primitives, such as, circles or rectangles etc. or other predefined objects, such as a person, an animal or a vehicle. Clustering of pixels in the scene and their associated depth values are used to determine whether a pixel belongs to a particular cluster in accordance with its depth value. If the pixel is at the same depth as a neighbouring pixel, it therefore assigned the same label as the cluster to which the neighbouring pixel belongs.

U.S. Pat. No. 6,771,818 discloses a method for identifying and locating people and objects of interest in a scene by selectively clustering distinct three-dimensional regions or "blobs" within the scene and comparing the "blob" clusters to a model for object recognition. An initial three-dimensional depth image of a scene of interest is generated. The spatial coordinates of three-dimensional image pixels within the three-dimensional volume represented by the image. The identification and location of people or objects is determined by processing a working image obtained from a background subtraction process using the initial three-dimensional depth image and a live depth image so that any pixel in the live depth image that differs significantly from the initial three-dimensional depth image becomes part of the working image that contains a number of distinct three-dimensional regions or "blobs". The "blobs" are processed to identify to which person or object each of the blobs belongs.

SUMMARY OF THE INVENTION

The object of the present invention is to provide a method for tracking an object in a frame sequence with pixel depth information which reliably tracks even partially occluded objects, and simultaneously provides information about the tracked object shape in a three-dimensional space which may be applied for gesture recognition.

In an embodiment, a computer-implemented method according to the invention comprises the following steps:
  grouping into several regions at least some of the pixels of each frame of a frame sequence comprising pixel depth information;
  grouping said regions into clusters of interconnected regions; and
  determining that at least one cluster which is adjacent to another cluster in a two-dimensional projection belongs to an object partially occluded by said other cluster if said at least one cluster has a depth value higher than that of said other cluster.

By "depth value" should be understood a depth value perpendicularly to the plane of said two-dimensional projection, independently of the position of an imaging device capturing said video sequence. The depth value is the distance of a pixel from the imaging device. Therefore, the depth value of one cluster (or a pixel within that cluster) can have a higher value than the depth value of another cluster (or pixel within that other cluster) due to it being further away from the imaging device.

It is a further object of the present invention to join clusters that belong to a single partially occluded object.

For this purpose, it may be determined whether two clusters which share adjacency to said other cluster in said two-dimensional projection and have higher depth values than said other cluster belong to a single object partially occluded by said other cluster depending on whether said higher depth values are within a predetermined range $\Delta d_1$ of each other.

It may also be determined whether two clusters which share adjacency to said other cluster in said two-dimensional projection and have higher depth values than said other cluster belong to a single object partially occluded by said other cluster depending on whether, in at least one axis of said two-dimensional projection, each one of those two clusters overlaps with the other one of those two clusters over at least a minimum length.

These two conditions may be applied individually or concurrently. Each one of these two conditions may be applied as an inclusive condition, so that two clusters are considered to belong to a single object if the condition is fulfilled, but this is still not excluded if the condition is not fulfilled. However, each one may also be applied as an exclusive condition, meaning that it would be excluded that the clusters belong to a single object if they do not fulfil that condition. In a particular embodiment, each condition may even be separately applied inclusively and exclusively, using different threshold values for inclusion and exclusion.

With this tracking method it is thus possible to keep tracking an object even when it is partially occluded by another object. Those regions poking out from behind an occluding cluster which can, through their relative positions, be reliably linked to each other, are identified as belonging to a partially occluded object. Moreover, this is achieved with a limited computing resource consumption and while providing, through the clusters of interconnected regions, useful information concerning the three-dimensional shape of the tracked objects.

In contrast, US 2006/239558 allocate the same label to pixels within a scene in accordance with their depth values. This means that pixels belonging to different distinct objects within the scene can erroneously be identified as being one or the same object.

In U.S. Pat. No. 6,771,818, the identified clusters are compared with models to determine whether a pixel belongs to an object that may be occluded.

Advantageously, the pixels may be grouped into regions using a vector quantization algorithm. In particular, in said vector quantization algorithm:
  in a first frame, the pixels may be grouped into K regions using a leader-follower algorithm;
  in a subsequent frame:
    a constrained K-means algorithm is used to group pixels into the regions of a previous frame, wherein a distance constraint is used to exclude pixels beyond a predetermined distance Q of a centroid of any of these regions;
    a leader-follower algorithm is used to group any remaining pixels into new regions;
    if finally, a region of the previous frame has not been assigned any pixel in this subsequent frame, this region may be deleted, reducing the number K by one.

In particular, in said leader-follower algorithm:
- if a pixel is beyond said distance Q of a region centroid, a new region is created, incrementing the number K by one; and
- if a pixel is within said distance Q of a region centroid, it is assigned to the corresponding region, and the position of the centroid updated accordingly.

Such a leader-follower algorithm provides a consistent distribution of the pixels into regions, while simultaneously maintaining a substantially constant granularity of the regions, ensuring a continuous refreshing of regions, and limiting the computing resource consumption.

Advantageously, it may be determined that two regions are connected in a three-dimensional space, if:
- at least one pixel in one of those two regions, and another pixel in the other one of those two regions are adjacent in a two-dimensional projection; and
- an average difference in depth in pairs of adjacent pixels of these two regions is below said predetermined distance $\Delta d_1$.

Two pixels may be considered adjacent in a two-dimensional projection if they are within a predetermined distance in at least one direction in said two-dimensional projection.

With these criteria, several regions grouping pixels representing points of a single body or several connected bodies in space can be grouped into a single cluster.

Even more advantageously, in a subsequent frame, it may be determined that a new region not present in a previous frame belongs to an existing cluster of interconnected regions which was already present in said previous frame if it is connected in said three-dimensional space to a region of said existing cluster, directly or through at least another region. The content of each cluster may thus be continuously updated taking into account any candidate region newly present in each subsequent frame.

Advantageously, a preferred embodiment of a method according to the invention may comprise, before grouping said pixels into regions, another step of deleting, from each frame in said sequence, each pixel whose depth value does not differ by at least a predetermined amount $\Delta d_2$ from a depth value of a corresponding pixel in a reference frame. The foreground objects are thus isolated from the background which was already present in the reference frame, further reducing the computing requirements of the computer-implemented tracking method.

Advantageously, said frame sequence may be a video sequence from a 3D imaging device capturing a real-world scene. The computer-implemented tracking method according to this embodiment of the invention may thus be used for real-time interaction with a computer system, for instance for inputting instructions or data, in applications such as, for example, video games, simulations, virtual environments, remote controls, etc.

Even more advantageously, in this embodiment of the invention, before the step of grouping the pixels into regions, a coordinate transformation may be carried out from a coordinate system linked to the imaging device, to another coordinate system linked to a point in said real-world scene. With this step, the pixel coordinates may be transformed to another coordinate system simplifying the subsequent steps of the tracking method in accordance with the present invention.

A further object of the present invention is to manage object activation and/or deactivation in an application using a method for tracking at least one object in a three-dimensional video sequence comprising a sequence of successive frames, each frame comprising a pixel array, wherein a depth value is associated to each pixel.

A method according to an advantageous embodiment of the invention may thus further comprise, for at least one frame of said sequence, the steps of pre-activating an object in said frame if it fulfils a first set of activation criteria, and activating a pre-activated object if it fulfils a second set of activation criteria under a predetermined activation rule. The first set of activation criteria thus acts as a first absolute filter. The subsequent activation of pre-activated objects not only depends on whether each pre-activated object fulfils the second set of activation criteria, but also on the activation rule.

Advantageously, said first set of activation criteria and/or said second set of activation criteria may comprise at least one of the following criteria:
- a maximum number of objects to be activated or deactivated;
- object position;
- object size;
- object motion;
- object shape;
- object colour;
- a maximum number of successive previous frames during which the object has been inactive; or
- user selection.

Advantageously, said activation rule may be one of the following set of activation rules:
- a forced activation rule which activates all pre-activated objects which fulfil the second set of activation criteria;
- a ranked activation rule which activates an object fulfilling said second set of activation criteria only if an active object is deactivated;
- a simple activation rule which activates an object which best fulfils said second set of activation criteria;
- a simple swap activation rule which activates an object if another, active object associated to it is deactivated;
- an occlusion activation rule which activates an object if it is or has been occluded by another object; or
- a contact swap activation rule which activates an object if it contacts another, active object.

These activation criteria and rules open a wide range of interaction possibilities based on the object tracking method of the invention.

Even more advantageously, an embodiment of a method according to the invention may also comprise, for at least one subsequent frame of said sequence, a step of deactivating a previously activated object if it fulfils a set of deactivation criteria under a predetermined deactivation rule.

Said set of deactivation criteria may comprise at least one of the following criteria:
- a maximum number of objects to be activated or deactivated;
- object position;
- object shape;
- object colour;
- object ranking;
- a maximum and/or minimum number of successive previous frames during which the object has been active; or
- user selection.

Said deactivation rule may be chosen from among the following:
- a forced deactivation rule which deactivates all active objects fulfilling said set of deactivation criteria;
- a ranked deactivation rule which deactivates an object fulfilling said set of deactivation criteria only if an inactive object is activated;
- a simple deactivation rule which deactivates an object which best fulfils said set of deactivation criteria;

a simple swap activation rule which deactivates an object if another, inactive object associated to it is activated; or a contact swap deactivation rule which deactivates an object if it contacts another, inactive but preactivated object.

The present invention also relates to a computer-readable data storage medium comprising computer-executable instructions for carrying out a method according to any one of the embodiments of the invention, as well as to a computer system with an input for a three-dimensional video sequence comprising a sequence of successive frames, each frame comprising a pixel array, wherein a depth value is associated to each pixel, and programmed so as to carry out a computer-implemented method according to any one of the embodiments of the invention.

By "computer-readable data storage medium", it is meant any computer-readable support containing digital data, including, but not restricted to, a solid state memory such as a random access memory, a flash memory, or a read-only memory, but also a magnetic data storage medium such as a hard disk drive or a magnetic tape, an optical data storage medium such as an optical disk, etc.

BRIEF DESCRIPTION OF THE DRAWINGS

These and other objects of the present invention will become more readily apparent upon reading the following detailed description and upon reference to the attached drawings in which.

While the present invention is susceptible of various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents and alternatives falling within the scope of the invention as expressed in the appended claims.

DETAILED DESCRIPTION OF THE INVENTION

Figure 1:
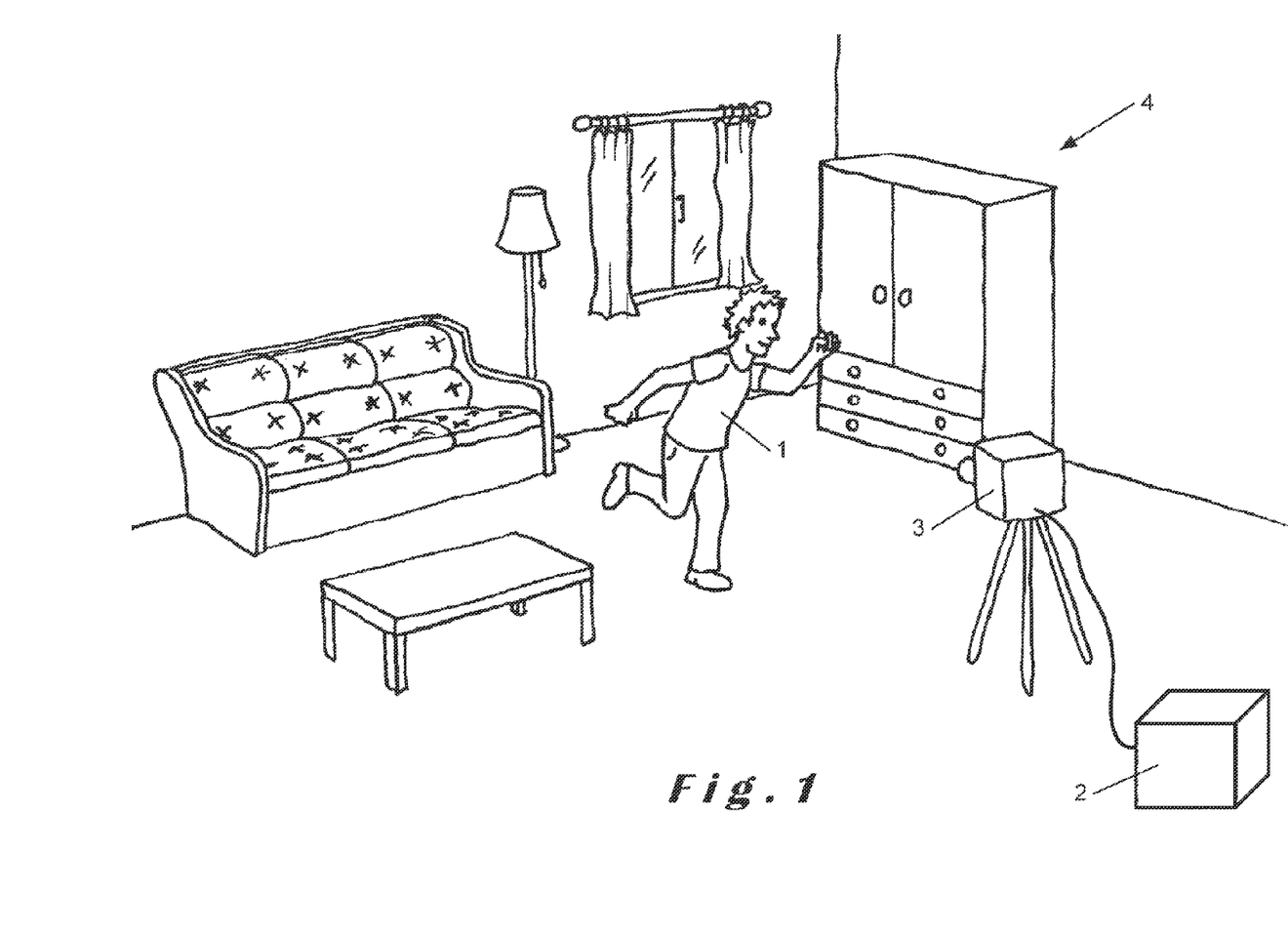
FIG. 1 shows a room with a human user standing in front of a 3D imaging device.

One of the possible uses of an embodiment of the computer-implemented object tracking method and computer system according to an embodiment of the invention is illustrated in FIG. 1. In this application, this system and method are used for the recognition of the gestures of an object of interest, in this case a human user 1, in order to interact with a computer system 2 generating a virtual environment displayed to the human user 1.

The volume recognition system comprises a 3D imaging system, in this particular embodiment a time-of-flight (TOF) 3D camera 3. This TOF 3D camera 3 is connected to the computer system 2 with which the human user 1 is to interact. In this embodiment, this computer system 2 is itself programmed to carry out, in cooperation with the TOF 3D camera 3, the volume recognition method of the invention. Alternatively, a separate data processing device programmed to carry out said method could be connected between the TOF 3D camera and the computer system 2 so as to enable the human user to interact with said computer system 2.

The TOF 3D camera 3 captures successive frames comprising 3D image data of the room 4 in which the human user 1 stands, comprising a 2D pixel array and a depth value for each pixel corresponding the distance to the TOF 3D camera 3 of the point imaged by that pixel. Since the vertical and horizontal positions of the pixels in the 2D pixel array themselves correspond to zenith and azimuth angles of the points they represent with respect to the TOF 3D camera 3, each frame can be illustrated as in FIG. 2 by a three-dimensional cloud of pixels 5 corresponding to visible points of the objects in range of the TOF 3D camera 3.

Figure 2:
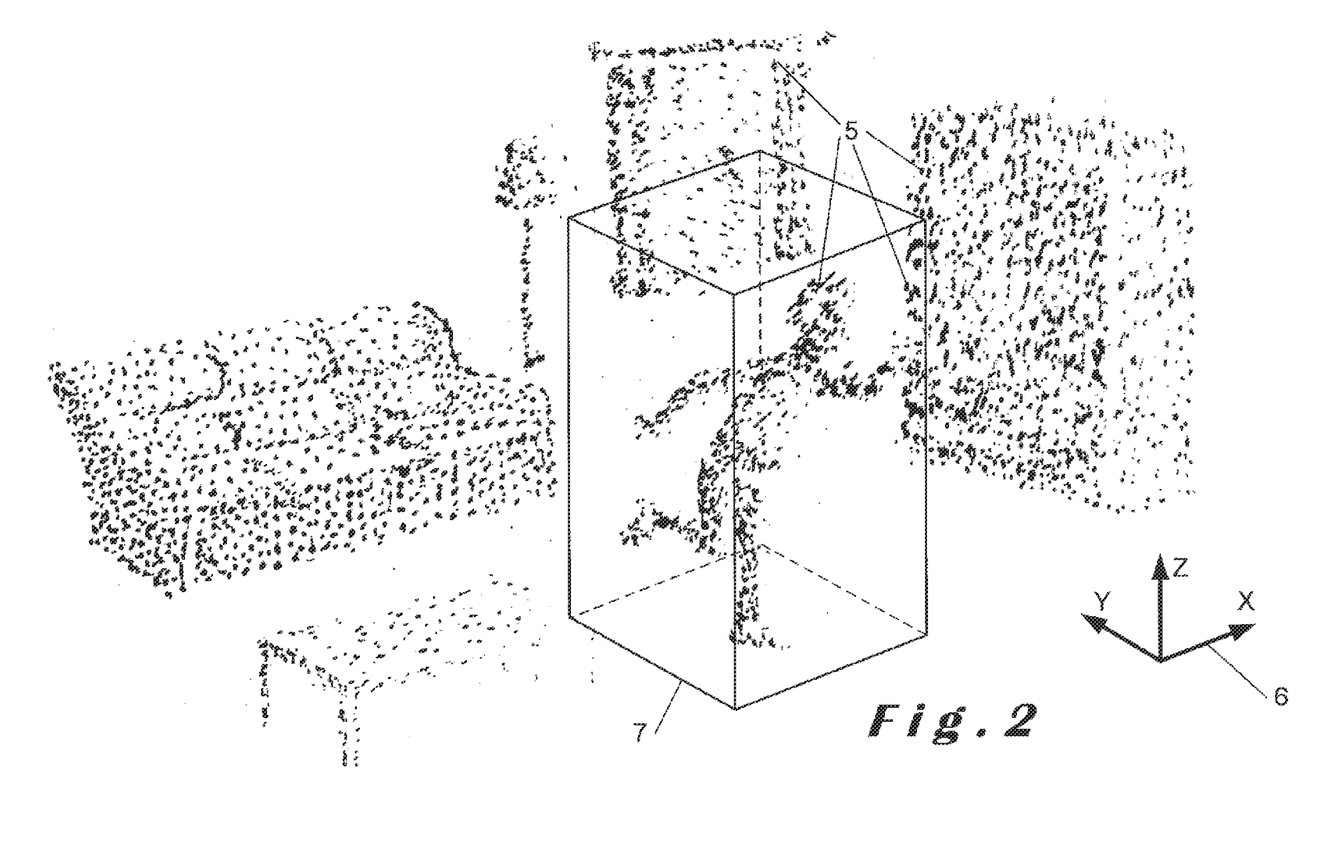
FIG. 2 shows three-dimensional image data of the same room, in the form of pixels distributed in the three-dimensional space, as captured by the 3D imaging system.

These successive frames form a three-dimensional video sequence which is transmitted to the computer system 2. In a first step, a data processor within said computer system 3 transforms the pixel positions relative to the camera of the three-dimensional cloud of pixels 5 of each frame in the video sequence into coordinates in a coordinate system 6 anchored in the scene. This coordinate system 6 comprises three orthogonal axes: a lateral axis X, a depth axis Y, and a height axis Z. After this, a filter may be used to eliminate from the frame those pixels for which insufficient information is available, or which may be due to sensor noise.

In a subsequent step, the pixels 5 in each frame corresponding to a scene background may also be eliminated by comparing the frame with a previously captured reference frame with only the background. All pixels 5 which are not beyond a threshold distance $\Delta d_2$ in said depth axis Y from a corresponding pixel in the reference frame is subtracted from the image. Alternatively, however, this background removal may instead be performed dynamically by updating the reference background in real time.

Subsequently, in order to reduce the data processing requirements, the resulting image may be clipped to a smaller volume 7 comprising the remaining pixels 5.

Those remaining pixels 5 are then grouped by the data processor into a plurality of regions $R_i$ in a computer memory, wherein i=1, . . . , K. The pixels are advantageously grouped using a vector quantization algorithm as follows:

In a first frame of the video sequence, the pixels are grouped into K regions using a leader-follower algorithm. In this algorithm, if a pixel is beyond said distance Q of a region centroid, a new region is created, incrementing the number K by one; and if a pixel is within said distance Q of a region centroid, it is assigned to the corresponding region, and the position of the centroid updated accordingly. Thus, starting from a first pixel in said first frame, since no region has yet been created (K=0), a first region is created, K is set equal to one, and the position of the centroid of this first region will be that of the first pixel. For the next pixel, if it is within said distance Q of the first pixel, it will be incorporated into the first region and the position of the centroid of the first region will change. If it is however beyond said distance Q, a new region will be created and K will be set equal to two.

In each subsequent frame, a constrained K-means algorithm is first used to group at least some of the pixels. The K-means algorithm is an iterative algorithm in which, after defining the initial positions $C_i$ of the centroids of K regions, which in this case are those which have been determined for a previous frame, in order to introduce a degree of temporal coherence, each pixel j of a set of N pixels is first associated to a region $R_s$ of said K regions designated by the equation:

$$s = \underset{i=1,\ldots,K}{\mathrm{argmin}}\left(\|P_j - C_i\|\right)$$

wherein $P_j$ is the position of the pixel j in the abovementioned coordinate system 6. In this particular constrained K-means algorithm, those pixels which are beyond said predetermined distance Q from a centroid are left unassigned.

After having allocated each pixel $j=1, \ldots, N$ to one of said K regions, the positions $C_i$ of the centroids of those K regions are updated by calculating the position of the centre of mass of the pixels allocated to each region:

$$C_i = \frac{\sum_{j \in R_i} P_j}{n}$$

wherein n is the number of pixels allocated to region $R_i$.

These two steps may then be carried out iteratively until converging on a stable allocation of pixels into K regions.

Then, the pixels left unassigned can be grouped into new regions using the same abovementioned leader-follower algorithm in which if a pixel is beyond said distance Q of a region centroid, a new region is created, incrementing the number K by one; and if a pixel is within said distance Q of a region centroid, it is assigned to the corresponding region, and the position of the centroid updated accordingly.

Finally, if a region of the K regions is left empty, without any pixel assigned to it in this frame, this region $R_i$ is deleted, reducing the number K by one.

Figure 3:
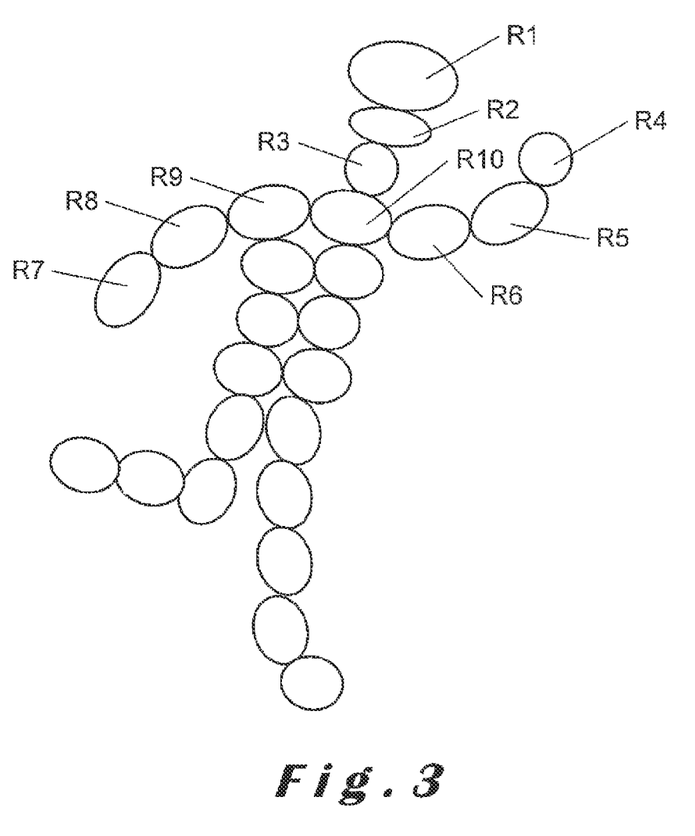
FIG. 3 shows a bidimensional projection of a clipped volume within said image data, and containing a cluster of interconnected regions grouping the pixels corresponding to the human user after a background elimination.

The resulting set of regions $R_i$ in a frame is illustrated in FIG. 3.

The next step for each frame involves the creation of a region adjacency graph (RAG), and grouping the regions $R_i$ into clusters B of interconnected regions in a computer memory. A data processor determines that two regions $R_a$, $R_b$ (wherein a and b are two different numbers between 0 and K) are connected in the three-dimensional space, if:

at least one pixel in region $R_a$ and another pixel in region $R_b$ are adjacent in a two-dimensional projection on the X-Z plane; and an average difference in depth in the Y axis in pairs of adjacent pixels of these two regions $R_a$, $R_b$ is below a predetermined distance $\Delta d_1$.

Two pixels are considered adjacent in a two-dimensional projection if one of these two pixels is the next, second next, or third next pixel of the other one in at least the X or the Z axes.

When two regions $R_a$, $R_b$ have pixels adjacent in a projection on the X-Z plane, but the average difference in depth of these pairs of adjacent pixels is beyond said predetermined distance $\Delta d_1$, the regions $R_a$ and $R_b$ may be flagged as probably connected. In this case, whether to group them into a single cluster $B_o$ as interconnected regions may depend on a set of additional criteria.

A number of clusters $B_o$ is created in a first frame, each cluster incorporating a set of interconnected regions. For subsequent frames, a new region $R_c$ will be incorporated into an existing cluster $B_o$ if it is connected, either directly, or through at least another region $R_d$, to a region of the existing cluster $B_o$. This is determined by a data processor executing the following algorithm:

For each region $R_i$:

If it was already present in the previous frame, and thus associated to an existing cluster $B_o$, then, considering temporal coherence, an indicator "distance $(R_i)$" of the distance of $R_i$ to the cluster to which it belongs is set to zero, an indicator "object $(R_i)$" is set to "$B_o$", and $R_i$ is stored in a list H sorted by increasing value of "distance $(R_i)$".

If not, "distance $(R_i)$" is set to "INFINITE", and "object $(R_i)$" is set to "NULL".

Then, as long as the list H is not emptied, repeat:

Extract from the list H the region $R_h$ with the lowest value of indicator "distance $(R_h)$".

For each region $R_v$ neighbouring region $R_h$:

Calculate d=distance $(R_h)$+distanceRAG $(R_h, R_v)$, wherein distanceRAG $(R_h, R_v)$=0 if $R_h$ and $R_v$ are connected, and distanceRAG $(R_h, R_v)$=INFINITE if $R_h$ and $R_v$ are not connected; and If d<distance $(R_v)$:

Set the value of "distance $(R_v)$" to the value of d;

Set the value of "object $(R_v)$" to the value of "object $(R_h)$"; and if the region $R_v$ is not in list H, then insert it into H;

if the region $R_v$ is already in list H, then extract it from H.

Figure 4A:
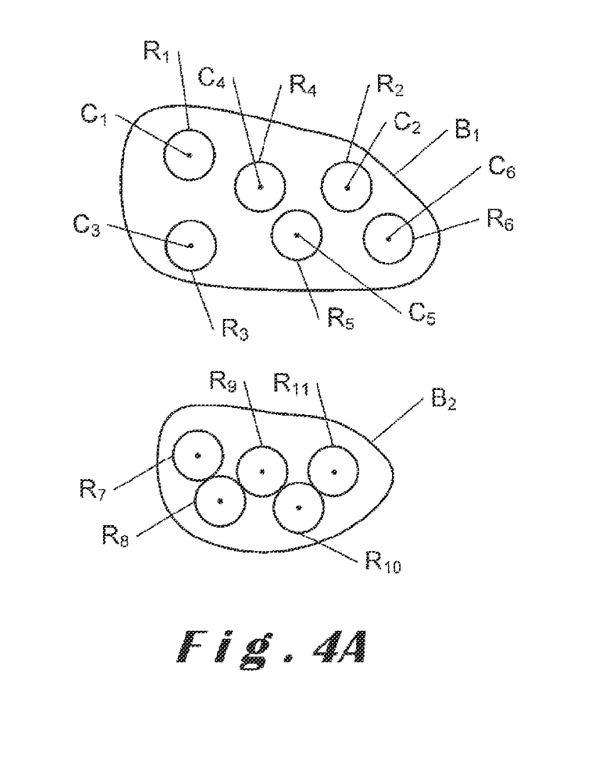
FIGS. 4A, 4B, and 4C show how clusters of interconnected regions are updated in successive frames of the 3D video sequence.
Figure 4B:
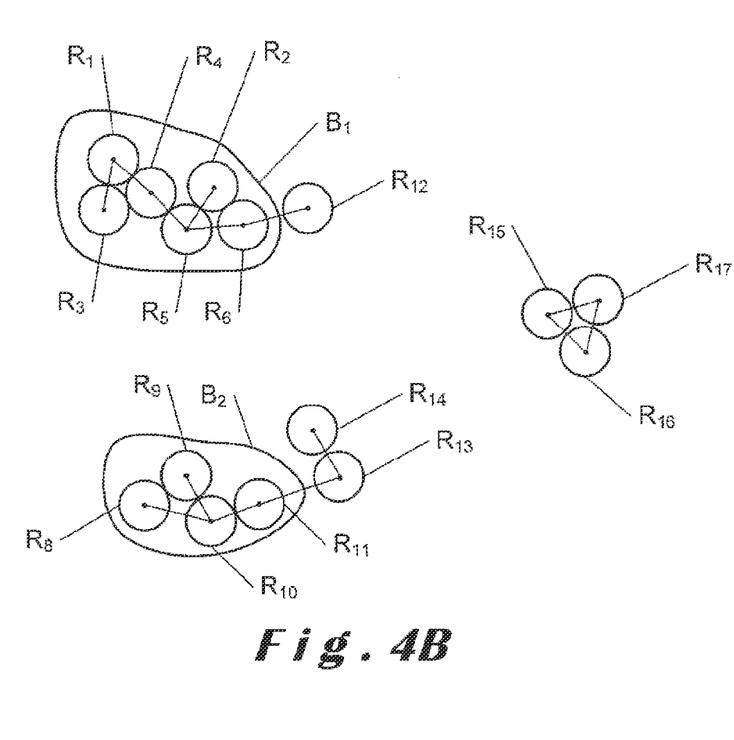
Figure 4C:
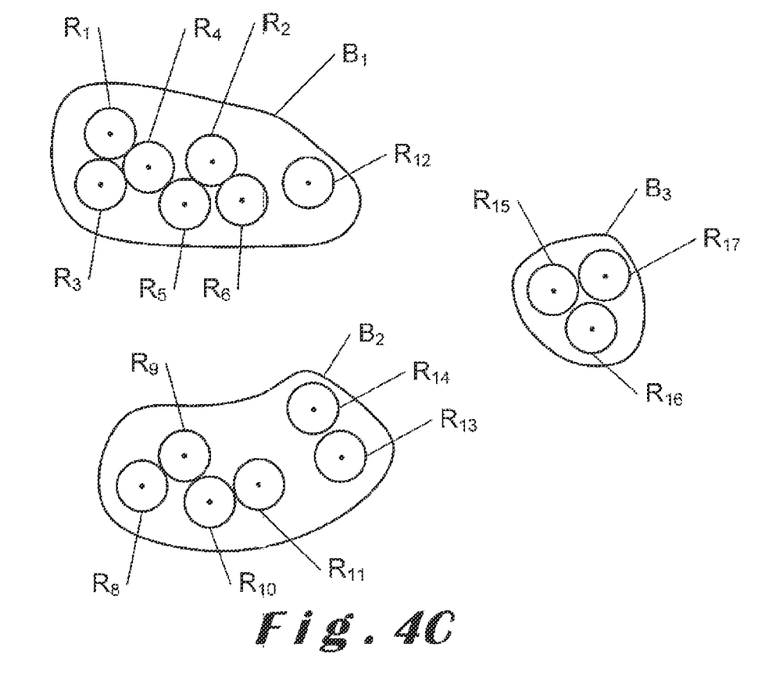

After all regions which can be connected to existing clusters have thus been incorporated into them, any remaining regions are checked for connections, and additional clusters incorporating such regions are created if necessary. FIGS. 4A, 4B, and 4C illustrate this transition between two successive frames:

In the first frame shown in FIG. 4A, two clusters $B_1$ and $B_2$ are present. $B_1$ comprises the interconnected regions $R_1$, $R_2$, $R_3$, $R_4$, $R_5$, and $R_6$, whereas $B_2$ comprises the interconnected regions $R_7$, $R_8$, $R_9$, $R_{10}$, and $R_{11}$. In the next frame, illustrated in FIG. 4B, $B_1$ and $B_2$ are still present, but $R_7$ has disappeared. On the other hand, new regions $R_{12}$, $R_{13}$, $R_{14}$, $R_{15}$, $R_{16}$, and $R_{17}$ have appeared. $R_{12}$ is connected to region $R_6$ of cluster $B_1$, $R_{13}$ is connected to region $R_{11}$ of cluster $B_2$, and $R_{14}$ is connected to $R_{13}$. $R_{15}$, $R_{16}$, and $R_{17}$ are interconnected, but do not connect to any other region or cluster. Thus, as can be seen in FIG. 4C, $R_{12}$ will be incorporated into cluster $B_1$, $R_{13}$ and $R_{14}$ will be incorporated into cluster $B_2$, and $R_{15}$, $R_{16}$, and $R_{17}$ will form a new cluster $B_3$.

In the next step, a cluster relationship graph (CRG) is established. In this CRG, pairs of clusters adjacent in a two-dimensional projection on the X-Z plane, that is, which each comprises a region with at least one pixel adjacent in a two-dimensional projection on the X-Z plane to at least one pixel in a region of the other cluster, are linked with a first type of link tagged "2D connection". Then, pairs of clusters wherein both clusters have a "2D connection" link to a common neighbouring cluster, but have a depth value higher than that of the common neighbour, and within a predetermined distance $\Delta d_1$ of each other in the depth axis, are linked with a second type of link tagged "3D connectable".

Clusters linked by "3D connectable" links possibly belong to an object partially occluded by another object represented by their common neighbour. To determine whether they should indeed be associated to each other as belonging to a single object, it is then checked whether they are "stackable" in said two-dimensional projection, that is, whether they overlap with each other in at least one axis of said two-dimensional projection by at least a minimum normalized length $o_{min}$. The value of the normalized overlap length $o=O/L$, wherein O is the absolute overlap length in that axis, and L is the length of the shorter of the two "3D connectable" clusters in that axis.

Figure 5:
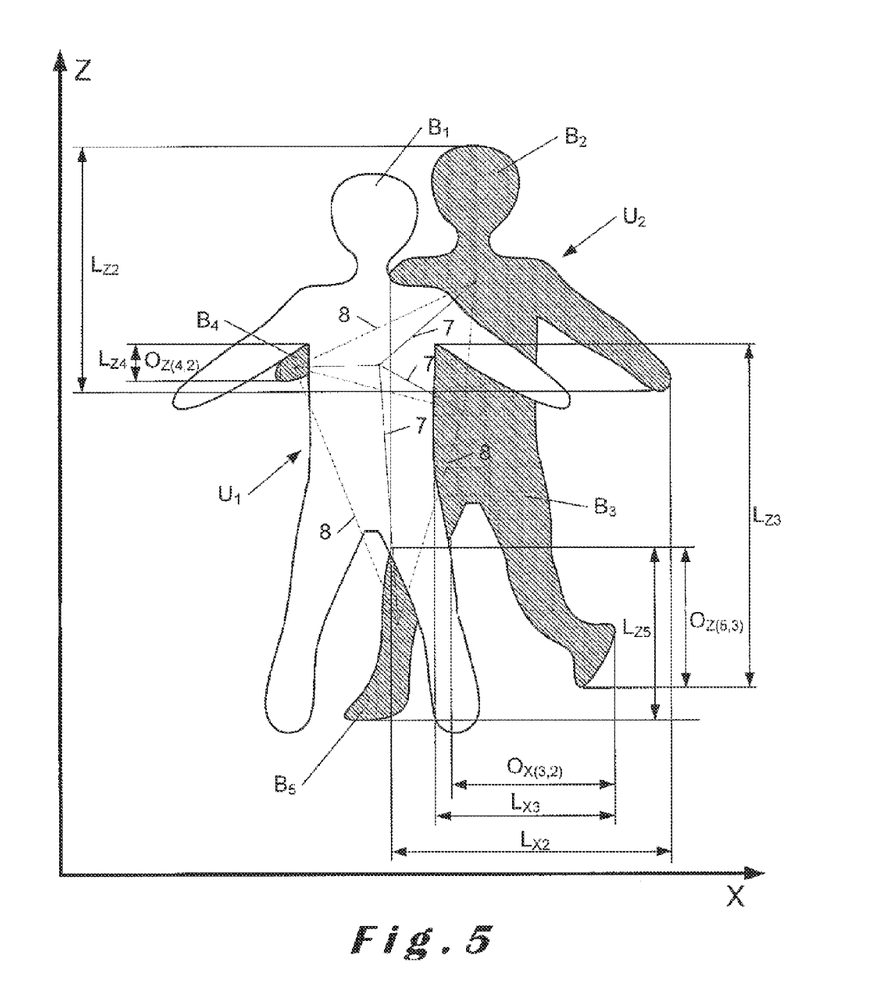
FIG. 5 shows a cluster of interconnected regions representing one human user, and partially occluding another human user.

FIG. 5 shows an example in which a frame shows a set of clusters $B_1$, $B_2$, $B_3$, $B_4$, and $B_5$ representing two objects, namely a first human user $U_1$ and a second human user $U_2$ partially occluded by the first human user $U_1$. It will readily be understood that the presence of the first human user $U_1$ in front of the second human user $U_2$ effectively divides the second human user $U_2$ into clusters $B_2$, $B_3$, $B_4$, and $B_5$. Since the clusters $B_2$, $B_3$, $B_4$, and $B_5$ are all adjacent to the cluster $B_1$ in a bi-dimensional projection in the X-Z plane, and their average depths in the Y-axis are superior to that of $B_1$ by more than a minimum distance, they can be linked with $B_1$ by "2D connection" links 7. Since they are also within a predetermined range from each other in the depth axis Y, they can be linked to each other with "3D connectable" links 8.

In the next step, it is thus checked whether those clusters $B_2$, $B_3$, $B_4$, and $B_5$ linked by links 8 of the "3D connectable" type also overlap with each other in at least one axis of said two-dimensional projection by at least a minimum normalized length $o_{min}$. In the illustrated example, $B_3$ overlaps with $B_2$ by a sufficient normalized length $o_{x(3,2)} > o_{min}$ in the X axis, and $B_4$ and $B_5$ also overlap with, respectively, $B_2$ and $B_3$, by sufficient normalized lengths $o_{z(4,2)} > o_{min}$ and $o_{z(5,3)} > o_{min}$ in the Z axis.

The normalized overlap length $o_{x(3,2)} = O_{x(3,2)}/L_{x3}$, wherein $O_{x(3,2)}$ is the overlap of $B_3$ with $B_2$ in the X axis and $L_{x3}$ is the length of $B_3$ in the X axis. The normalized overlap length $o_{z(4,2)} = O_{z(4,2)}/L_{z4}$, wherein $O_{z(4,2)}$ is the overlap of $B_4$ with $B_2$ in the Z axis, and $L_{z4}$ is the length of $B_4$ in the Z axis. Finally, the normalized overlap length $o_{z(5,3)} = O_{z(5,3)}/L_{z5}$, wherein $O_{z(5,3)}$ is the overlap of $B_5$ with $B_3$ in the Z axis, and $L_{z5}$ is the length of $B_5$ in the Z axis.

The clusters $B_2$, $B_3$, $B_4$, and $B_5$ can thus be assigned in the computer memory to a single object $U_2$ partially occluded by another object $U_1$ comprising the cluster $B_1$.

While in this illustrated embodiment, these "3D connectable" and "stackable" tests are used in combination, wherein it is excluded that the clusters belong to a single object if they do not fulfil both conditions, they may, in alternative embodiments, be used independently from each other, or in parallel to each other. Each one of these two conditions may be applied as an inclusive condition, so that two clusters are considered to belong to a single object if the condition is fulfilled, but this is still not excluded if the condition is not fulfilled. Each condition may even be separately applied inclusively and exclusively, using different threshold values for inclusion and exclusion.

For a subsequent frame, the data processor will create a new CRG and first check, using the abovementioned test, whether any new clusters may be assigned to an existing object. Then it will check, using the same test, whether any remaining new clusters may be grouped into a new object.

A plurality of objects can thus be tracked throughout the frame sequence, even when one of the objects is partially occluded by another one. Such objects may be fixed or mobile. When this object-tracking method is used for interacting with a computer application, such as a video game, a simulation, or a virtual reality application, each one of the tracked objects may be activated and/or deactivated according to various sets of activation/deactivation criteria and activation/deactivation rules.

In a particular embodiment of the present invention, a method for tracking at least an object in a sequence of frames, each frame comprising a pixel array, wherein a depth value is associated to each pixel, also comprises, for at least one frame, the steps of pre-activating an object in said frame if it fulfils a first set of activation criteria and activating a pre-activated object if it fulfils a second set of activation criteria under a predetermined activation rule.

Preferably, this method may also comprise, for at least one subsequent frame of said sequence, a step of deactivating a previously activated object if it fulfils a set of deactivation criteria under a predetermined deactivation rule.

The first set of activation criteria may comprise at least one of the following:

Object position: With this requirement, a tracked object will thus be pre-activated if it is within a certain relative position range with respect to (or even in contact with) a mobile reference, such as for instance another tracked object and/or a fixed reference.

Object size: With this requirement, a tracked object will thus be pre-activated if it has at least a predetermined minimum size and/or at most a predetermined maximum size in one, two, or three dimensions.

Object motion: With this requirement, a tracked object will thus be preactivated if it presents at least a predetermined minimum motion and/or at most a predetermined maximum motion with respect to at least one previous frame in the sequence.

Object shape: With this requirement, a tracked object will thus be preactivated if its shape can be matched to a predetermined pattern, such as, for example, a pattern representing a human body.

Object colour: With this requirement, a tracked object will thus be preactivated if it contains one or several pixels with colour values within a predetermined colour range.

Object persistence: With this requirement, a tracked object will thus be preactivated if it has been tracked as active or inactive for at least a minimum number and/or at most a maximum number of successive previous frames.

User selection: With this requirement, a tracked object will thus be preactivated if it has been previously been flagged by an explicit user selection, such as, for instance, a "make object visible" command.

Maximum number of active objects: With this requirement, a tracked object will thus be activated if the number of active objects does not exceed a predetermined maximum.

This second set of activation criteria is used in conjunction with an activation rule. This activation rule may be, for instance, a forced activation rule which activates all pre-activated objects which fulfil the second set of activation criteria, a ranked activation rule which activates an object fulfilling said second set of activation criteria only if an active object is deactivated, a simple activation rule which activates one or several objects which best fulfil said second set of activation criteria, a simple swap activation rule which activates an object if another active object associated to it is deactivated, an occlusion activation rule which activates an object if it is or has been occluded by another object, or a contact swap activation rule which activates an object if it contacts another active object.

The set of deactivation criteria may comprise criteria analogous to those of the second set of activation criteria. It may also comprise an object ranking criterion, which will allow deactivation of an active object if the object's ranking is below a minimum. The object ranking may be determined, for instance, by the order in which the set of active objects were activated.

The deactivation rule may be, for example, a forced deactivation rule which deactivates all active objects fulfilling said set of deactivation criteria, a ranked deactivation rule which deactivates an object fulfilling said set of deactivation criteria only if an inactive object is activated, a simple deactivation rule which deactivates an object which best fulfils said set of deactivation criteria, a simple swap activation rule which deactivates an object if another inactive object associated to it is activated, or a contact swap deactivation rule which deactivates an object if it contacts another inactive but pre-activated object.

Various scenarios are thus available, depending on the combination of activation and deactivation criteria and rules.

Figure 6A:
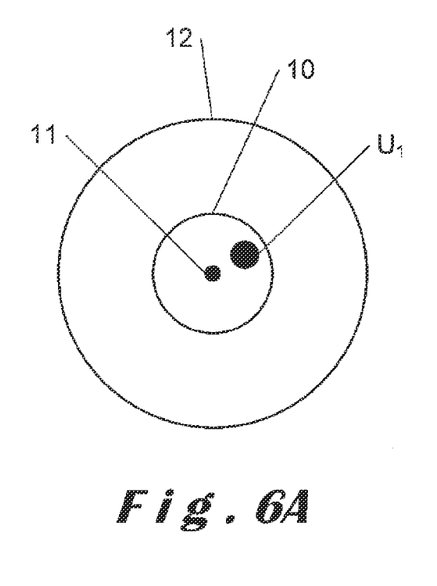
FIGS. 6A, 6B and 6C show how an object may be activated and deactivated using a position criteria and simple activation and deactivation rules.
Figure 6B:
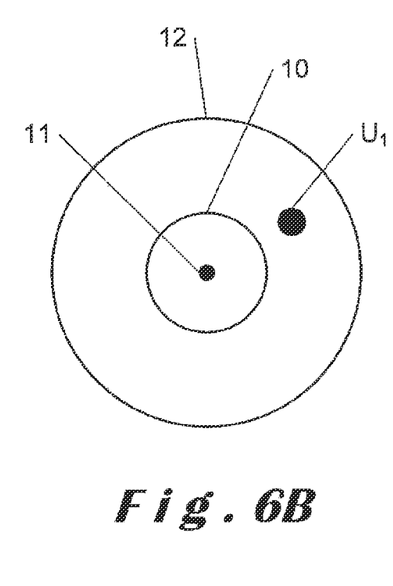
Figure 6C:
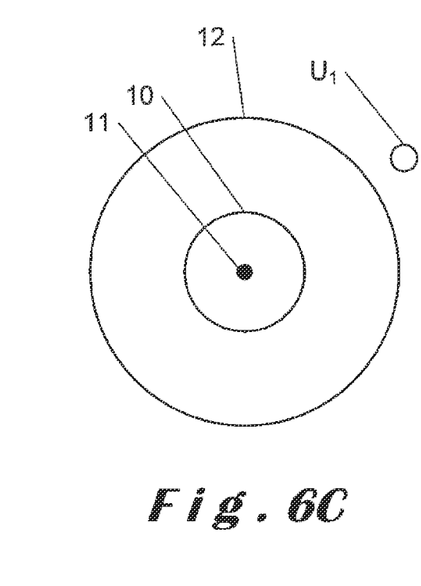

For instance, in FIG. 6A an object $U_1$ is shown which has entered, in a pre-activated state, a circle 10 centred around a fixed reference 11, fulfilling a position criterion for activation. The object $U_1$ is consequently activated according to a simple activation rule. In FIG. 6B, the object $U_1$ has exited the circle 10, but because the position criterion for deactivation is a position beyond the larger circle 12, it remains active. Only when the object $U_1$ exits a larger circle 12, as shown in FIG. 6C, it may be deactivated under another simple deactivation rule.

Figure 7A:
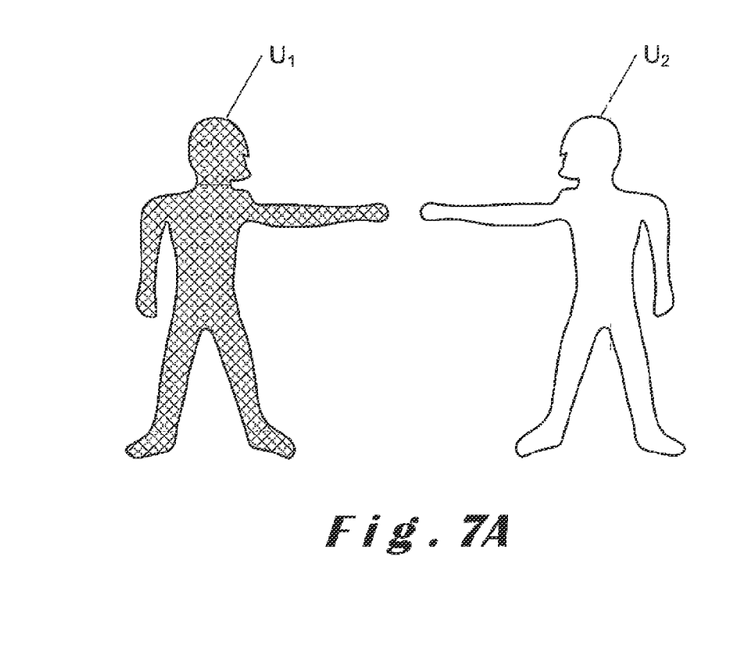
FIGS. 7A and 7B show how a first object may be activated, and a second object deactivated using position criteria and contact swap rules.

In FIG. 7A, two objects $U_1$ and $U_2$ are shown not in contact. In this case, the two objections $U_1$ and $U_2$ correspond to respective users, User 1 and User 2. The first object $U_1$ is active, and the second object $U_2$ is in a pre-activated state. Since the first object $U_1$ fulfils a position criterion for deactivation which is in contact with an inactive, but pre-activated object, it may be deactivated under a contact swap deactivation rule. On the other hand, since the second object $U_2$ fulfils a position criterion for activation which is contact with an active object, it will be activated under a contact swap activation rule. The resulting state swap is shown in FIG. 7B.

Figure 7B:
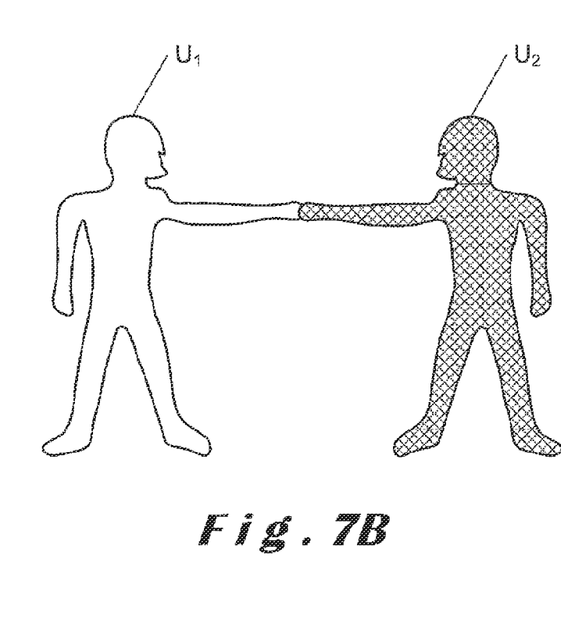

In FIG. 7B, under the contract swap activation rule, when object $U_2$ comes into contact with object $U_1$, object $U_2$ becomes activated (as it was inactive but pre-activated) and object $U_1$ becomes deactivated as it is now in contact with an activated object $U_2$.

Figure 8A:
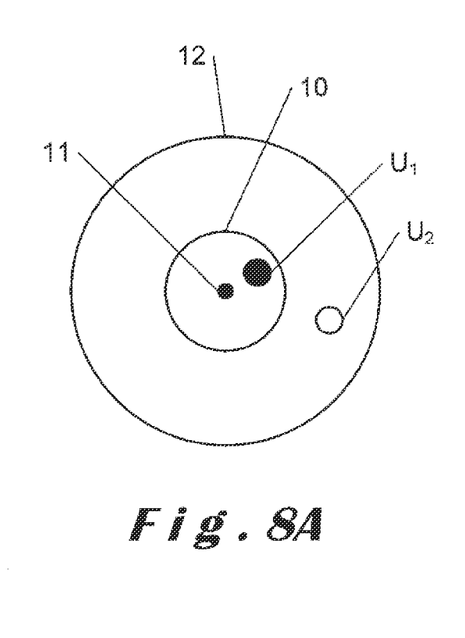
FIGS. 8A, 8B and 8C show how a first object is activated and deactivated using position criteria and simple activation and deactivation rules, and a second object is activated using position criteria and a ranked activation rule.
Figure 8B:
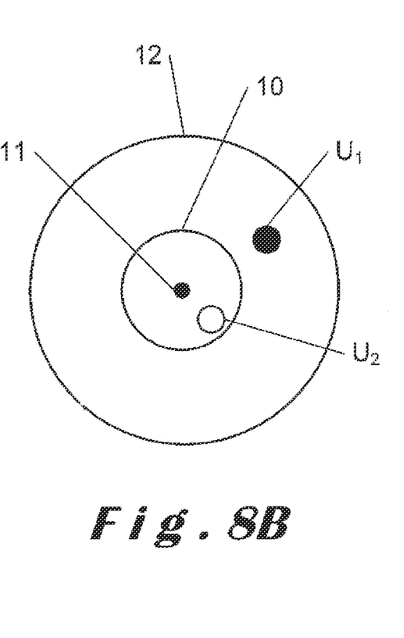
Figure 8C:
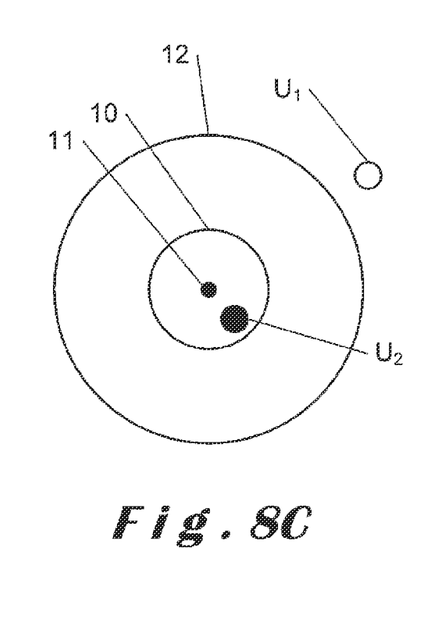

In FIG. 8A, a first object $U_1$ is shown which has entered, in a pre-activated state, a circle 10 centred around a fixed reference 11, fulfilling a position criterion for activation. This first object $U_1$ is consequently activated according to a simple activation rule. A second object $U_2$ which is not within circle 10 remains inactive. In FIG. 8B, the first object $U_1$ is now outside circle 10. However, because the position criterion for deactivation is a position beyond the larger circle 12, it remains active. Although the second object $U_2$ is now pre-activated and within circle 10, under a ranked activation rule, it can not be activated while the first object $U_1$ remains active. Only when the first object $U_1$ is deactivated after exiting the larger circle 12, as shown in FIG. 8C, may the second object $U_2$ be activated under this ranked activation rule.

It will be appreciated that more than one object may be activated at any one time if the activation/deactivation rules allow. This will enable two or more users to interact within the same three-dimensional space viewed by the three-dimensional imaging system in accordance with the present invention.

Although the present invention has been described with reference to specific exemplary embodiments, it will be evident that various modifications and changes may be made to these embodiments without departing from the broader scope of the invention as set forth in the claims. For example, the steps of preactivating, activating and/or deactivating an object may be performed independently of how or whether it is determined that several clusters belong to a single partially occluded object. Accordingly, the description and drawings are to be regarded in an illustrative sense rather than a restrictive sense.

The invention claimed is:

1. A computer-implemented method for tracking at least one object (U1, U2) in a sequence of frames, each frame comprising a pixel array, wherein a depth measurement value is associated with each pixel (5), said method comprising the following steps:
   a) grouping at least some of said pixels (5) of each frame into several regions (R1, ..., R17); and
   b) grouping said regions (R1, ..., R17) into clusters (B1, ..., B5) of interconnected regions, said clusters (B1, ..., B5) of interconnected regions corresponding to said at least one object (U1, U2);
   characterised in that the method further comprises the steps of:
   c) determining if at least one cluster (B2, ..., B5) having at least a first depth value and which is adjacent to another cluster (B1) having another depth value in a two-dimensional projection belongs to an object (U2) which is partially occluded by said other cluster (B1) corresponding to another object (U1) if said at least first depth value of said at least one cluster (B2, ..., B5) is higher than that of said other cluster (B1); and
   d) determining if two clusters (B2, ..., B5) sharing adjacency to said other cluster (B1) in said two-dimensional projection belong to said object (U2) in accordance with said first depth values of said two clusters (B2, ..., B5) being within a predetermined range $\Delta d1$ of one other.

2. A computer-implemented method according to claim 1, wherein step d) further comprises determining whether, in at least one axis of said two-dimensional projection, each one of said two clusters (B2, ..., B5) overlaps with said other one of said two clusters (B2, ..., B5).

3. A computer-implemented method according to claim 1, wherein at least some of the pixels (5) are grouped into regions (R1, ..., R17) with a data processor using a vector quantization algorithm.

4. A computer-implemented method according to claim 3, wherein, in said vector quantization algorithm:
   in a first frame, the pixels (5) are grouped into K regions (R1, ..., R11) using a leader-follower algorithm;
   in a subsequent frame:
      a constrained K-means algorithm is used to group pixels (5) into the regions (R1, ..., R11) of a previous frame, wherein a distance constraint is used to exclude pixels (5) beyond a predetermined distance Q of a region centroid (C1, ..., C11);
      a leader-follower algorithm is used to group any remaining pixels (5) into new regions (R12, ..., R17); and
      if finally, a region (R7) of the previous frame has not been assigned any pixel (5) in this subsequent frame, this region (R7) is deleted, reducing the number K by one.

5. A computer-implemented method according to claim 4, wherein, in said leader-follower algorithm:
   if a pixel (5) is beyond said distance Q of a region centroid (C1, ..., C11), a new region (R12, ..., R17) is created, incrementing the number K by one; and if a pixel (5) is within said distance Q of a region centroid, it is assigned to the corresponding region (R1, ..., R11), and the position of the centroid (C1, ..., C11) updated accordingly.

6. A computer-implemented method according to claim 3, wherein, in a subsequent frame, it is determined that a new region (R12; R13, R14) not present in a previous frame belongs to an existing cluster of interconnected regions which was already present in said previous frame if it is connected in said three-dimensional space to a region (R6; R11) of said existing cluster, directly or through at least another region (R13).

7. A computer-implemented method according to claim 1, wherein it is determined that two regions (R1, ..., R17) are connected in a three-dimensional space, if:
   at least one pixel (5) in one of those two regions (R1, ..., R17), and another pixel (5) in the other one of those two regions (R1, ..., R17) are adjacent in a two-dimensional projection; and
   an average difference in depth in pairs of adjacent pixels (5) of these two regions (R1, ..., R17) is below said predetermined distance $\Delta d1$.

8. A computer-implemented method according to claim 1, which, before grouping said pixels (5) into regions (R1, ..., R17), comprises another step of deleting, from each frame in said series, each pixel (5) whose depth value does not differ by at least a predetermined amount $\Delta d2$ from a depth value of a corresponding pixel (5) in a reference frame.

9. A computer-implemented method according to claim 1, wherein said frame sequence is a video sequence from a 3D imaging device capturing a real-world scene.

10. A computer-implemented method according to claim 9, wherein, before the step of grouping the pixels into regions (R1, ..., R17), a coordinate transformation is carried out from a coordinate system linked to the imaging device, to another coordinate system linked to a point in said real-world scene.

11. A computer-implemented method according to claim 1, further comprising, for at least one frame of said sequence, the following steps:
   preactivating an object (U1, U2) in said frame if it fulfils a first set of activation criteria; and
   activating a preactivated object (U1, U2) if it fulfils a second set of activation criteria under a predetermined activation rule.

12. A computer-implemented method according to claim 11, wherein said first set of activation criteria and/or said second set of activation criteria comprises at least one of the following criteria:
   a maximum number of objects to be activated;
   object position;
   object size;
   object motion;
   object shape;
   object colour;
   a minimum and/or maximum number of successive previous frames during which the object has been active or inactive; or
   user selection.

13. A computer-implemented method according to claim 11, wherein said activation rule is one of the following set of activation rules:
   a forced activation rule which activates all preactivated objects fulfilling said second set of activation criteria;
   a ranked activation rule which activates an object fulfilling said second set of activation criteria only if an active object is deactivated;
   a simple activation rule which activates one or several objects which best fulfil said second set of activation criteria;
   a simple swap activation rule which activates an object if another, active object associated to it is deactivated;
   an occlusion activation rule which activates an object if it is or has been occluded by another object; or
   a contact swap activation rule which activates an object if it contacts another, active object.

14. A computer-implemented method according to claim 11, further comprising, for at least one subsequent frame of said sequence, a step of deactivating a previously activated object if it fulfils a set of deactivation criteria under a predetermined deactivation rule.

15. A computer-implemented method according to claim 14, wherein said set of deactivation criteria comprises at least one of the following criteria:
   a maximum number of objects to be activated or deactivated;
   object position;
   object size;
   object shape;
   object colour;
   object ranking;
   a maximum and/or minimum number of successive previous frames during which the object has been active; or
   user selection.

16. A computer-implemented method according to claim 15, wherein said deactivation rule is one of the following set of deactivation rules:
   a forced deactivation rule which deactivates all active objects fulfilling said set of deactivation criteria;
   a ranked deactivation rule which deactivates an object fulfilling said set of deactivation criteria only if an inactive object is activated;
   a simple deactivation rule which deactivates an object which best fulfils said set of deactivation criteria;
   a simple swap activation rule which deactivates an object if another, inactive object associated to it is activated; or
   a contact swap deactivation rule which deactivates an object if it contacts another, inactive but preactivated object.

17. A computer-readable data storage medium comprising computer-executable instructions for carrying out a computer-implemented method according to claim 1.

18. A computer system programmed so as to carry out a computer-implemented method according to claim 1.

* * * * *